United States Patent [19]

Dawson

[11] 4,213,043
[45] Jul. 15, 1980

[54] METHOD FOR FLOWING A LARGE VOLUME OF PLASMA THROUGH AN EXCITATION REGION

[75] Inventor: John M. Dawson, Pacific Palisades, Calif.

[73] Assignee: TRW Inc., Redondo Beach, Calif.

[21] Appl. No.: 817,328

[22] Filed: Jul. 20, 1977

[51] Int. Cl.² .................... B01D 59/44; H01J 27/00
[52] U.S. Cl. ............................ 250/283; 250/292; 250/427
[58] Field of Search ............. 250/424, 427, 290, 292, 250/283

[56] References Cited

U.S. PATENT DOCUMENTS

| | | | |
|---|---|---|---|
| 2,733,348 | 1/1956 | Lawton et al. | 250/427 |
| 2,836,750 | 5/1958 | Weimer | 250/427 |
| 2,935,634 | 5/1960 | Lerbs | 250/427 |
| 4,066,893 | 1/1978 | Dawson | 250/281 |

*Primary Examiner*—Harold A. Dixon
*Attorney, Agent, or Firm*—Benjamin DeWitt; John J. Connors

[57] ABSTRACT

A plasma isotope separation process and apparatus. The plasma must be generated and moved into an excitation region for the differential heating of a selected isotope. This motion is accomplished by a crossed magnetic and electric field whereby charged particles move normal to the direction of both fields. The plasma is generated by electrons liberated from hot filaments and the electric field is generated by a plurality of electrodes forming an anode for providing an electric field in a desired direction. An alternating electric voltage may additionally be imparted to the anode to generate an alternating electric field, thereby to differentially excite the isotope of the plasma.

13 Claims, 4 Drawing Figures

METHOD FOR FLOWING A LARGE VOLUME OF PLASMA THROUGH AN EXCITATION REGION

CROSS REFERENCE TO RELATED APPLICATIONS

This application is related to the Applicant's prior application Ser. No. 562,993 filed on Mar. 27, 1975, now abandoned, and the continuing application of Jan. 24, 1977, Ser. No. 761,939. Reference is also made to a related application to Reiner Stenzel filed on June 9, 1976, Ser. No. 694,492, now U.S. Pat. No. 4,093,856.

BACKGROUND OF THE INVENTION

This application relates generally to the separation of isotopes and particularly relates to the isotope separation process in a dense plasma of the type disclosed in the Applicant's prior application above referred to.

The prior Dawson application discloses a process and apparatus for separating isotopes from each other in a dense plasma. Basically, a dense plasma is provided and a magnetic field is generated about the plasma. The isotopes are now pumped or energized at the cyclotron frequency of a desired isotope. As a result, the desired isotope acquires more energy than the others. Subsequently, the more energetic isotope can now be separated from the others on the basis of its higher energy.

In order to carry out this process on a relatively large scale, it is necessary to move the magnetized plasma including the isotopes to be separated through a so-called pumping region where they acquire differential energies. The present invention is particularly directed to a method and apparatus for positively moving the ionized isotopes, that is the plasma, through such a pumping region.

A U.S. Pat. No. 3,939,354, also relates to apparatus for separating ions from a plasma. The plasma is created by radiation. Thus the gas may be radiated by a laser to energize a desired isotope. The energized isotope is then ionized by a second radiation.

The ion is separated in a chamber having a collecting electrode. The electrons are made to circulate about the collector electrode so as not to interfere with the collecting process. A suitable MHD acceleration field is created by a cross electric and magnetic field. The ions in turn travel substantially along a straight line toward the collecting electrode.

It is accordingly an object of the present invention to provide an improved process of an apparatus for separating isotopes from each other in a dense plasma.

A further object of the present invention is to provide such an improved process or apparatus whereby an electric field gradient can be generated by utilizing a plurality of electrodes held at different potentials and jointly forming an anode.

Another object of the present invention is to provide a process of the type disclosed wherein the necessary plasma is generated by a set of hot filaments to produce energetic electrons which in turn ionize a gas to create a plasma.

SUMMARY OF THE INVENTION

In accordance with the present invention, there is provided a method of separating one isotope of an element from the others. The method comprises the step of generating a stream of relatively energetic electrons originating substantially in a plane. A magnetic field is generated in a direction substantially parallel to the movement of the stream of electrons, that is normal to the plane. An electric field is generated spaced from the region of the electrons and substantially normal to the direction of the magnetic field. A gas is introduced into the space between the stream of electrons and the electric field. Accordingly, the electrons will ionize the gas and the ionized particles will move substantially normal both to the direction of the magnetic field and the direction of the electric field. Finally, an electric oscillating field is generated which has a frequency corresponding to the resonant frequency of the selected or desired isotope. This in turn will impart more energy to the ions of the selected isotope than to the other ions. The more energetic isotopes will move in the direction indicated where they can be collected.

Apparatus for carrying out this process is also disclosed.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

DESCRIPTION OF THE PREFERRED EMBODIMENT

Figure 1:
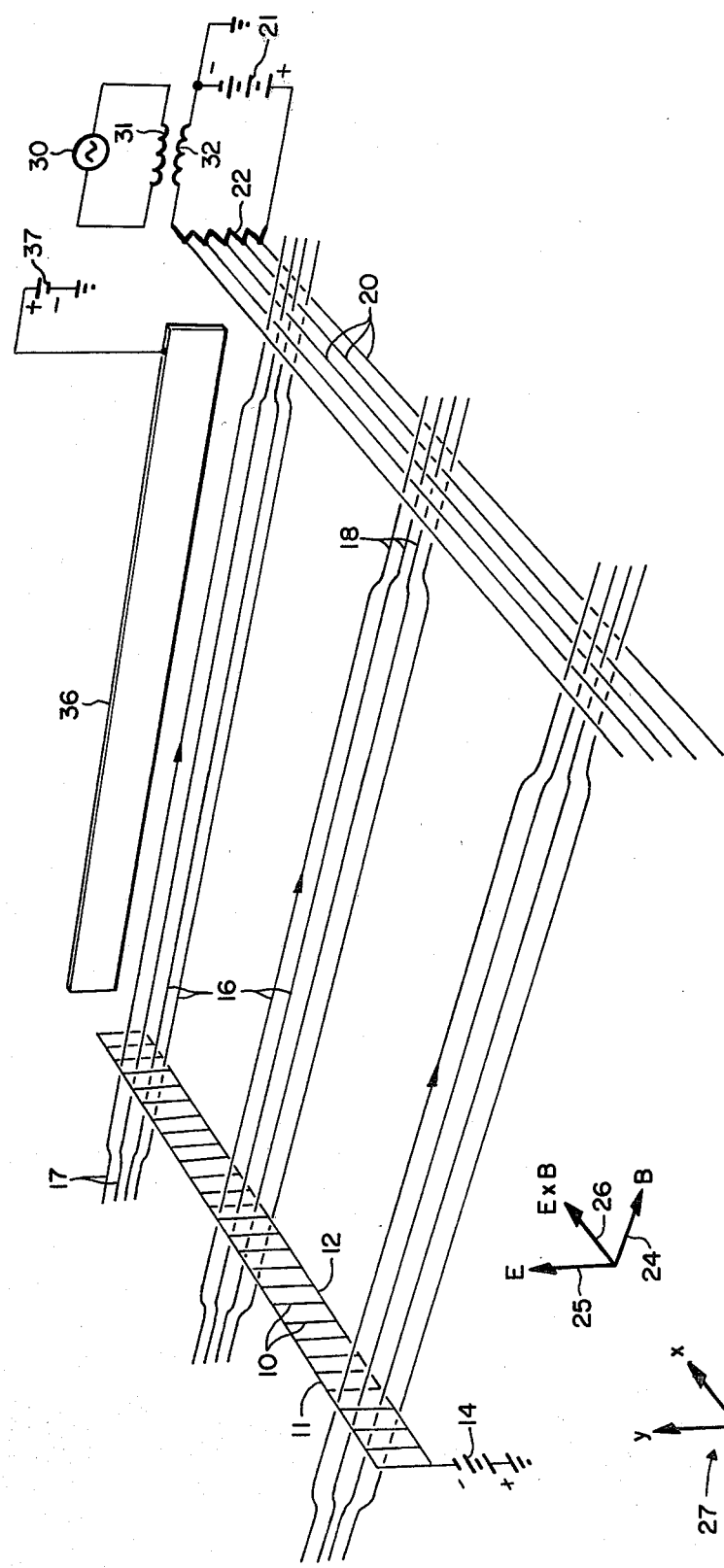
FIG. 1 is a schematic view in perspective of apparatus in accordance with the present invention for generating a crossed electric and magnetic field thereby to move energetic particles in a direction normal to both fields, the drawing showing the direction of the electric field, of the magnetic field and of the ExB field, that is the direction in which the particles move.

Referring now to the drawings, and particularly to FIG. 1, there is illustrated schematically an apparatus for carrying out the present invention. This apparatus is designed to generate both a magnetic field and an electric field normal to each other whereby charged particles are driven in a direction normal to both electric and magnetic fields. In order to generate a plasma a suitable gas is introduced into the space shown in FIG. 1. Such a gas may, for example, consist of an alkali metal heated to a suitable temperature whereby it becomes gaseous. By way of example, the alkali metal may consist of potassium. Alternatively, a suitable uranium compound may be used becomes gaseous at elevated temperatures. Among such compounds is uranium hexafluoride. Generally the density of the plasma should be on the order of $10^{10}$ to the order of $10^{13}$ particles per cubic centimeter. This then represents a dense plasma.

In order to generate a plasma from the gas, there is provided a plurality of hot filaments 10. These filaments extend vertically in the view shown in FIG. 1 and they may be interconnected electrically as shown at 11 and 12. The filaments 10 are supplied with a negative voltage which may, for example, be generated by the battery 14 having its positive pole grounded and its negative pole connected to the wires 11 and 12. The voltage provided by the battery 14 may, for example, be on the order of 50 volts with respect to ground.

Figure 3:
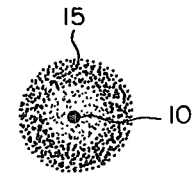
FIG. 3 schematically shows a section through one of the hot filaments for generating electrons and the surrounding plasma sheath.

As shown in FIG. 3, one of the filaments 10 is surrounded by a sheath of charged particles, that is by a sheath of plasma 15. The plasma may be considered to be basically at ground potential and accordingly the electrons are accelerated by a voltage of −50 volts with respect to the plasma. Such relatively energetic electrons will impact with neutral atoms or molecules knocking electrons from the atoms or molecules so as to generate electrically charged ions which are, of course, generally positively charged; the resulting plasma is overall neutral.

It will now be assumed that a magnetic field designated B extends from left to right of the view of FIG. 1 corresponding magnetic field lines are shown at 16 in FIG. 1. The magnetic field may be generated in any conventional manner, for example by one or more coils conducting electric current as in conventional. The coils may, for example, consist of superconductive material whereby the electric current will continue to run as long as the superconductive coils are cooled to the required temperature where they exhibit superconductivity.

As shown at 17 and 18 to the left and right of FIG. 1, the magnetic field lines 16 narrow or converge toward each other. This is due to the effect of a magnetic mirror arranged in the vicinity of the converging field lines 17 and 18 at either end of the structure of FIG. 1. They serve a purpose to be explained hereinafter.

To the right of the structure of FIG. 1 there is disposed a plurality of substantially parallel filaments or electrodes 20 jointly forming an anode. The filaments 20 are disposed parallel to each other and at right angles to the hot filaments 10 which may be considered to be the cathode of the device. The anode 20 may be supplied with a positive potential by means of a battery 21 having its negative terminal grounded as shown. A resistor 22 is connected in parallel with the battery 21. Accordingly, a voltage drop will occur across the resistor 22. The resistor may be tapped at suitable points so that each tap is connected to one of the electrodes 20.

As a result, an electric field designated E is created by the filaments of the anode 20. FIG. 1 illustrates an arrow 24 showing the direction of the magnetic field B corresponding to the direction of the field lines 16. Another arrow 25 indicates the direction of the electric field E which is normal to the direction of the magnetic field 24. The third arrow 26 of the coordinate system is designated E×B. This indicates the direction in which charged particles tend to move. The arrows 24, 25, 26 correspond respectively to the coordinate system ZYX also shown in FIG. 1 at 27.

It will now be seen that the electrons liberated from the filaments 10 create a plasma in a suitable gas. The charged particles of the plasma move in the direction of arrow 26, that is from the front toward the back of FIG. 1.

In accordance with the Applicant's prior application hereinabove referred to, the separation of the isotope takes place in a dense plasma where the charged particles, that is the ions, are spun up or heated. The cyclotron frequency is different for each isotope and depends on the effect of the number of particles in the plasma, the strength of the magnetic field, and the ratio of electric charge to the mass of the isotope on the collective resonant frequency. In this connection, reference is made to the prior application above referred to.

In accordance with the present invention, a resonant frequency is generated by an oscillation generator 30 to which is connected in parallel a primary winding 31 which in turn energizes the secondary winding 32 connected in series to the battery 21 and the resistor 22.

Figure 2:
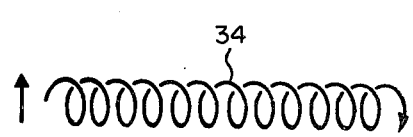
FIG. 2 schematically indicates the path of one of the more energetic ions of a selected isotope.

As a result, the direct-current electric voltage and the alternating voltage is different for each filament. As a result of the crossed alternating electric and steady magnetic field charged particles are spun up in a generally helical path 34 as shown in FIG. 2. The diameter of the helical path 34 and accordingly the desired isotopes are moved more than the others in the direction of arrow 26. Collector plate 36 is disposed in the read of FIG. 1, that is in the direction of the ion movement. It will be understood that the undesired isotopes are not spun up as the resonant frequency of the desired isotopes. Hence, they do not tend to be collected by collector 36. Collector 36 may be positively biased by a battery 37. having its negative terminal grounded. This will tend to repel less energetic positive ions while permitting the more energetic positive ions to reach the collector 36.

Figure 4:
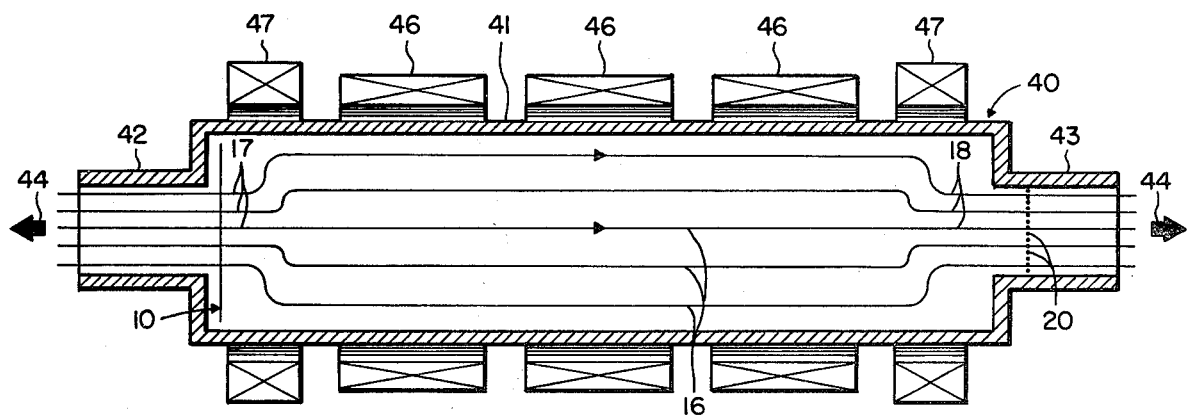
FIG. 4 is a cross-sectional view of apparatus in accordance with the present invention and corresponding generally to the arrangement of FIG. 1.

Apparatus for carrying out the process of the present invention is illustrated by the structure of FIG. 4. The apparatus includes a container generally shown at 40. It has an enlarged central position 41 similar to the structure of FIG. 1. It has two end portions 42 and 43 which may also be used as output ports. The container 40 may be evacuated at both ends 42, 43 as shown by arrows 44. The magnetic coils 46 surrounding the central position 41 generate the magnetic field B. The magnetic mirrors 47 consist of magnetic coils generating a stronger magnetic field and hence the magnetic field lines 16 are compressed at the two ends as shown at 17 and 18.

As has been explained in the prior Dawson application above referred to, the less energetic particles tend to move out toward the left and right of the structure of FIG. 2, that is through the magnetic field created by the magnetic mirrors 47. Hence they may be pumped out or collected at the end. On the other hand the more energetic particles will acquire a helical path of increasingly larger diameter, they will be reflected by the magnetic mirrors, and will eventually be collected by the collector 36. It should be noted that the collector 36 may either consist of a single relatively large structure as shown in FIG. 1 or may consist of a plurality of smaller rectangular collectors in the nature of a venetian blind.

Hence the enriched species will eventually be collected by the collector 36 while the other isotopes migrate out of the structure of FIG. 4 in the direction of arrows 44.

Preferably as shown in FIG. 1, the hot filaments 10 are in the region where the magnetic field lines are relatively far apart, that is where the magnetic field is not too strong. On the other hand, the electrodes or anode 20 are preferably in the region where the magnetic field lines are close together.

The collector 36 whether it consists of a single plate or a plurality of slats may also be suitably electrically biased to attract the desired isotope species and to repel the other isotopes as previously indicated. In FIG. 4 the filaments 10 have been shown schematically and the anode filaments 20 at the other end.

There has thus been disclosed apparatus for and a method of separating isotopes from each other in a dense plasma. A relatively large volume of plasma can be made to flow through the apparatus of the invention. This is due to the fact that an electric and a magnetic field are disposed normal to each other. Accordingly, charged particles are forced to move normal to both the magnetic and the electric fields. A collector may be disposed in the path of the moving particles. Since a desired isotope is made more energetic it is preferentially collected by the collector. This is partly due to the larger diameter of its path and partly due to an electric field which may be imposed on the collector to repel the less energetic and undesired ions. Also, the undesired ions tend to flow out of the magnetic mirror fields at the ends of the container.

What is claimed is:

1. In an apparatus for separating a selected isotope of an element from other isotopes thereof, the combination comprising:
   (a) an elongated substantially evacuated container having a longitudinal axis;
   (b) means for providing a magnetic field extending substantially parallel to said axis within said container;
   (c) means for providing, within said magnetic field, a substantially neutral plasma including ions of an element having at least two isotopes;
   (d) means applying an alternating electric field to at least a portion of the plasma for imparting more kinetic energy to selected-isotope ions than to other-isotope ions so that the selected-isotope ions travel in helical paths of increasing diameter within the magnetic field;
   (e) means for augmenting the magnetic field strength in a region adjacent each end of said container to thereby provide a pair of longitudinally spaced magnetic mirrors for reflecting and containing the more energetic selected-isotope ions while allowing the less energetic other-isotope ions to pass longitudinally out of the region between the magnetic mirrors;
   (f) a plurality of electrically distinct electrodes disposed within said container for electrically contacting the plasma so that the electric potentials within different longitudinally extending portions of the plasma are determined by the potential of the electrode contacting each such portion;
   (g) means for applying a different direct-current potential to each of said electrodes and thereby producing, within the plasma, a d-c electric field extending in a predetermined direction substantially normal to the longitudinal axis so that helically orbiting charged particles are subjected to an E×B drift force and caused to move in a direction substantially normal to that of both the magnetic field and the electric field; and
   (h) collection means, located adjacent the plasma at the side thereof toward which said E×B drift force is directed, for collecting ions which have been moved transversely of the plasma by the action of said E×B drift force.

2. The apparatus of claim 1 wherein said means for applying an alternating electric field comprises circuitry for coupling, to at least a pair of said electrodes, a voltage having a frequency correlated to the orbital frequency of the selected-isotope ions.

3. The apparatus of claim 1 wherein said collection means comprises at least one conductive element having a substantially planar surface positioned substantially normal to the direction of said E×B force.

4. The apparatus of claim 1 wherein said collection means comprises at least one conductive element and biasing means for applying thereto a sufficient biasing voltage to repel ions having kinetic energies below a predetermined energy level.

5. An apparatus as defined in claim 1 wherein said collection means comprises a plurality of elongated conductive elements extending transversely of the magnetic field direction in a single plane which is substantially normal to the direction of said E×B force.

6. Apparatus for separating one isotope of an element from the others comprising:
   (a) an elongated evacuated container having two ends;
   (b) a plurality of filaments extending across one end of said container and forming a cathode;
   (c) means for applying a voltage to said filaments to liberate electrons;
   (d) means for introducing the element to be separated in a gaseous form into said container whereby the electrons generated by said filaments will ionize the gas to form a dense plasma;
   (e) means for generating a magnetic field in said container;
   (f) a plurality of electrodes forming an anode and disposed at the opposite end of said container;
   (g) means for supplying a direct-current electric voltage to each of said electrodes so that each electrode has a voltage different from that of an adjacent electrode in such a manner to create an electric field in a predetermined direction and substantially at right angles to the direction of the magnetic field, whereby electrically charged particles will move in a direction substantially normal to that of both the magnetic and electric fields;
   (h) means for additionally imparting to said electrodes an oscillating electric voltage having a frequency corresponding to the resonant frequency of a selected isotope in the plasma; and
   (i) a collector arranged substantially between said filaments and said electrodes and disposed substantially in a plane substantially parallel to the direction of the electric field for collecting the ions to which more energy has been imparted by the oscillating electric voltage.

7. Apparatus as defined in claim 6 wherein said collector consists of a single plate.

8. Apparatus as defined in claim 6 wherein said collector consists of a plurality of slats disposed substantially in a single plane.

9. Apparatus as defined in claim 6 wherein an electric repelling voltage is supplied to said collector for differentially collecting more energetic ions corresponding to the desired isotope while repelling less energetic ions.

10. Apparatus as defined in claim 6 wherein said filaments are disposed substantially parallel to each other and are connected together to form a single conductive unit.

11. Apparatus as defined in claim 10 wherein said electrodes forming said anode are disposed substantially at right angles to the direction of said interconnected filaments.

12. Apparatus as defined in claim 6 wherein a magnetic mirror is disposed in the neighborhood of said filaments and in the neighborhood of said electrodes to cause a higher density of the magnetic field in the neighborhood of said filaments and of said electrodes.

13. Apparatus as defined in claim 12 wherein said anode is disposed within the magnetic field created by its associated magnetic mirror.

* * * * *